US010932620B2

(12) United States Patent
Ahmed et al.

(10) Patent No.: US 10,932,620 B2
(45) Date of Patent: Mar. 2, 2021

(54) HIGH EFFICIENCY WIND RESISTANT KETTLE GRILL

(71) Applicant: W.C. Bradley Co., Columbus, GA (US)

(72) Inventors: Mallik Ahmed, Columbus, GA (US); Bruce Roberts, Midland, GA (US)

(73) Assignee: W.C. Bradley Co., Columbus, GA (US)

( * ) Notice: Subject to any disclaimer, the term of this patent is extended or adjusted under 35 U.S.C. 154(b) by 999 days.

(21) Appl. No.: 14/132,447

(22) Filed: Dec. 18, 2013

(65) Prior Publication Data

US 2014/0165993 A1 Jun. 19, 2014

Related U.S. Application Data

(60) Provisional application No. 61/739,135, filed on Dec. 19, 2012.

(51) Int. Cl.
*A47J 37/07* (2006.01)

(52) U.S. Cl.
CPC ....... *A47J 37/0704* (2013.01); *A47J 37/0763* (2013.01); *A47J 37/07* (2013.01); *Y10T 29/49826* (2015.01)

(58) Field of Classification Search
CPC ..... A47J 37/0704; A47J 37/07; A47J 37/0763
USPC ......... 99/339, 340, 425, 446; 126/9 R, 25 R, 126/25 A, 25 B, 25 C, 25 RN, 29 N, 15 R, 126/275 R
IPC ....................................................... A47J 37/07
See application file for complete search history.

(56) References Cited

U.S. PATENT DOCUMENTS

| | | | | |
|---|---|---|---|---|
| 1,399,704 A | * | 12/1921 | Eida | F24C 15/08 126/1 R |
| 3,051,159 A | * | 8/1962 | Peters | A47J 33/00 126/25 A |
| 3,581,731 A | * | 6/1971 | Schulze | A47J 37/0763 126/25 R |
| 3,765,397 A | * | 10/1973 | Henderson | F24B 3/00 126/25 B |
| 3,868,943 A | * | 3/1975 | Hottenroth | A47J 37/0754 126/25 R |
| 3,959,620 A | * | 5/1976 | Stephen, Jr. | A47J 37/0709 126/25 R |
| 4,281,633 A | * | 8/1981 | Wackerman | A47J 37/0704 126/25 A |
| 4,342,259 A | * | 8/1982 | Lee | A47J 37/0713 126/41 R |

(Continued)

FOREIGN PATENT DOCUMENTS

CN 2817693 Y 9/2006
CN 201182526 Y 1/2009
(Continued)

OTHER PUBLICATIONS

Myhrvold et al., "Modernist Cuisine", "Techniques and Equipment", pp. 717, vol. 2, Chapter 7, Publisher: The Cooking Lab.

*Primary Examiner* — Daniel E. Namay
(74) *Attorney, Agent, or Firm* — David G. Woodral; GableGotwals (57) ABSTRACT

A lower housing has a fuel grate situated at a predetermined level within the lower housing for supporting a fuel source. The lower housing has a first wall defining a plurality of air intake openings proximate the level of the fuel grate.

6 Claims, 11 Drawing Sheets

(56) References Cited

U.S. PATENT DOCUMENTS

| | | | | |
|---|---|---|---|---|
| 4,382,432 A * | 5/1983 | Lizdas | | A47J 37/0704 |
| | | | | 126/25 A |
| 4,416,248 A | 11/1983 | Schlosser | | |
| 4,508,024 A * | 4/1985 | Perkins | | A47J 37/06 |
| | | | | 126/27 |
| 4,582,041 A * | 4/1986 | Erickson | | A47J 37/0704 |
| | | | | 126/25 R |
| 4,829,975 A * | 5/1989 | Hait | | F24B 1/202 |
| | | | | 126/152 B |
| 4,884,551 A * | 12/1989 | Hait | | F24C 1/16 |
| | | | | 126/25 R |
| 4,909,235 A * | 3/1990 | Boetcker | | F24C 1/16 |
| | | | | 126/25 C |
| 4,924,847 A | 5/1990 | Patenaude | | |
| 5,230,325 A | 7/1993 | Williams | | |
| 5,325,841 A * | 7/1994 | Hooper, Sr. | | A47J 37/0704 |
| | | | | 126/25 R |
| 5,359,988 A * | 11/1994 | Hait | | A47J 37/0704 |
| | | | | 126/153 |
| 5,425,352 A * | 6/1995 | Gillam | | A47J 37/0763 |
| | | | | 126/25 R |
| 5,535,733 A | 7/1996 | Hait | | |
| 5,687,704 A * | 11/1997 | Lerch | | A47J 37/0763 |
| | | | | 126/25 R |
| 5,797,386 A * | 8/1998 | Orr | | A47J 37/0704 |
| | | | | 126/25 A |
| 5,842,463 A * | 12/1998 | Hall | | F24B 1/202 |
| | | | | 126/15 R |
| 5,947,013 A * | 9/1999 | Stewart, Jr. | | A47J 37/0694 |
| | | | | 126/25 R |
| 5,947,106 A * | 9/1999 | Davis | | A47J 37/0786 |
| | | | | 126/242 |
| D427,840 S * | 7/2000 | Pai | | D7/332 |
| 6,125,838 A | 10/2000 | Hedgpeth | | |
| 6,314,955 B1 * | 11/2001 | Boetcker | | A47J 36/2477 |
| | | | | 126/25 R |
| 6,941,941 B1 * | 9/2005 | Hall | | A47J 37/0704 |
| | | | | 126/25 R |
| 7,984,709 B1 | 7/2011 | Byrnes et al. | | |
| 8,479,720 B1 * | 7/2013 | Figueroa | | A47J 37/0704 |
| | | | | 110/108 |
| 9,237,828 B2 * | 1/2016 | Walters | | A47J 37/0759 |
| 2004/0031478 A1 * | 2/2004 | Gifford | | A47J 37/0704 |
| | | | | 126/25 AA |
| 2005/0211237 A1 * | 9/2005 | Woller | | A47J 37/0763 |
| | | | | 126/25 R |
| 2006/0225724 A1 * | 10/2006 | Turner | | F24C 1/16 |
| | | | | 126/9 R |
| 2009/0308373 A1 * | 12/2009 | Scott | | A47J 36/06 |
| | | | | 126/25 R |
| 2010/0258104 A1 | 10/2010 | Defoort et al. | | |
| 2010/0258106 A1 * | 10/2010 | Simms, II | | A47J 37/0704 |
| | | | | 126/25 R |
| 2011/0283990 A1 * | 11/2011 | Walters | | A47J 37/0759 |
| | | | | 126/25 R |
| 2012/0090593 A1 * | 4/2012 | Urquhart | | A47J 37/079 |
| | | | | 126/25 B |
| 2013/0319255 A1 * | 12/2013 | Chiang | | A47J 37/0704 |
| | | | | 99/339 |
| 2016/0029840 A1 * | 2/2016 | Walters | | A47J 37/0704 |
| | | | | 126/25 R |

FOREIGN PATENT DOCUMENTS

| | | |
|---|---|---|
| CN | 102125401 A | 7/2011 |
| CN | 202277249 | 6/2012 |
| CN | 102631145 | 8/2012 |
| CN | 202477411 U | 10/2012 |
| CN | 201380073347.2 | 9/2016 |
| CN | 201380073347.2 | 6/2017 |
| DK | 176696 B1 | 3/2003 |
| EP | 138663554 | 9/2016 |
| WO | WO2013006849 A1 | 1/2013 |
| WO | WO23013006849 A1 | 1/2013 |
| WO | PCTUS201376030 | 4/2014 |

* cited by examiner

HIGH EFFICIENCY WIND RESISTANT KETTLE GRILL

CROSS-REFERENCE TO RELATED CASES

This application claims the benefit of U.S. provisional patent application Ser. No. 61/739,135 filed on Dec. 19, 2012, and incorporates such provisional application by reference into this disclosure as if fully set out at this point.

FIELD OF THE INVENTION

The present invention relates to outdoor cooking grills which burn charcoal or other solid fuel and have a kettle-type shape.

BACKGROUND OF THE INVENTION

Figure 1:
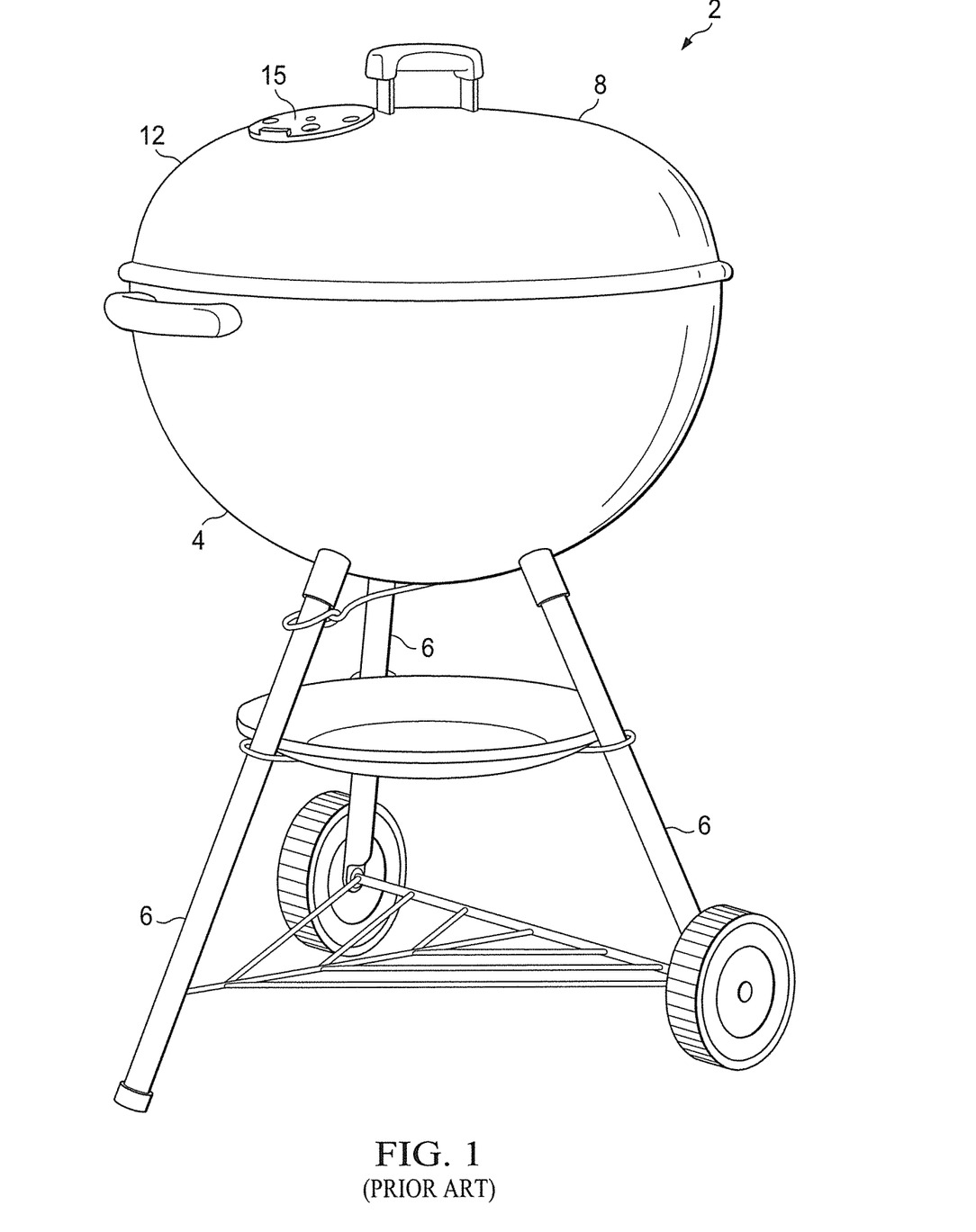
FIG. 1 is a perspective view of a prior art kettle grill 2.
Figure 2:
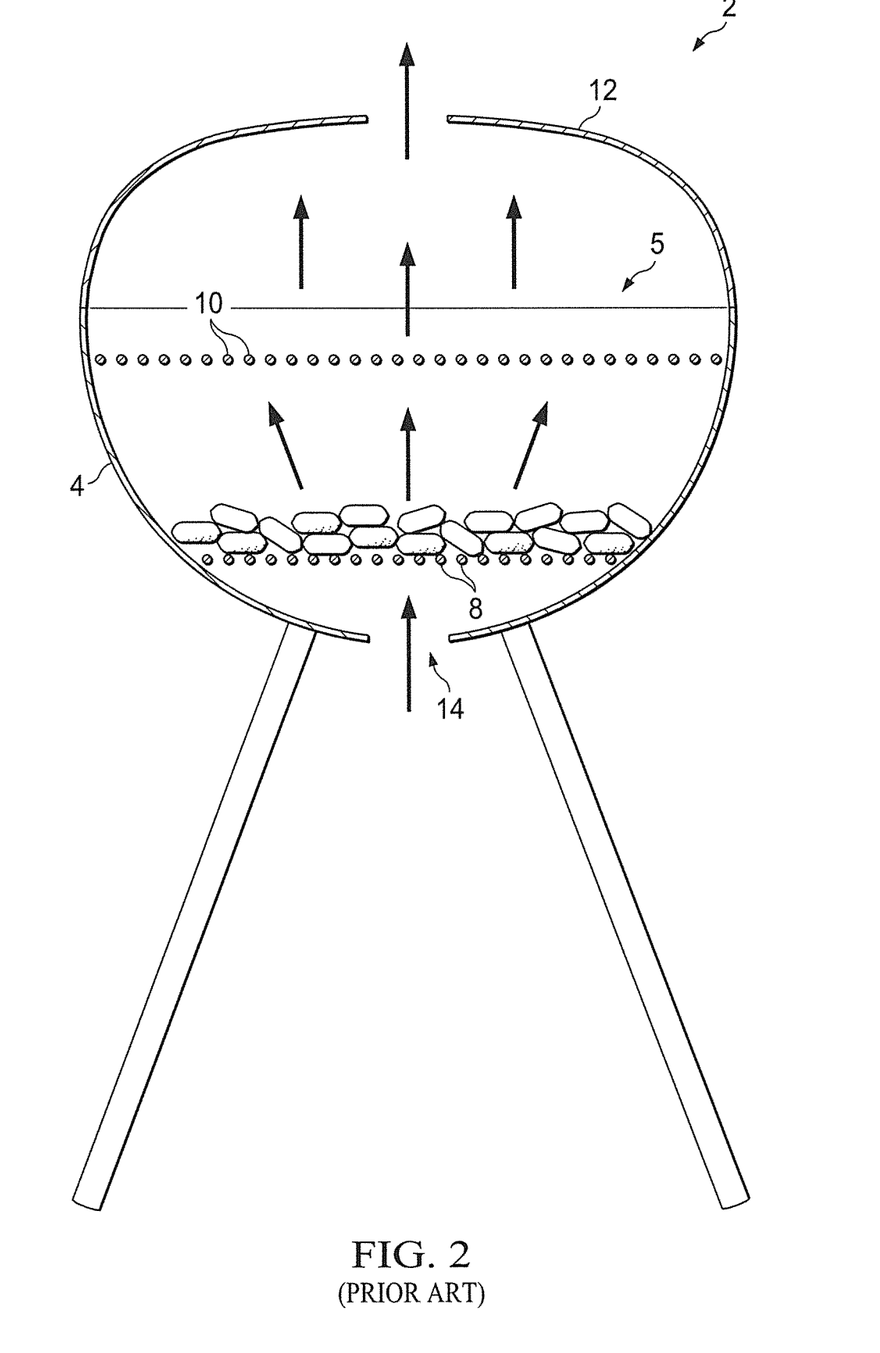
FIG. 2 is a cutaway elevational view of a kettle-type lower housing 4 of the prior art grill 2.

Kettle-type outdoor cooking grills which burn charcoal are well known in the art. An example of a typical prior art kettle-type grill 2 is illustrated in FIGS. 1 and 2. The prior art grill 2 comprises: a hemispherical, bowl-shaped lower housing 4 which has an open top 5 and is supported above the ground at a suitable height by a plurality of legs 6; a fuel grate 8 positioned within the lower housing 4 for supporting a bed of charcoal fuel; a cooking grate 10 positioned within the lower housing 4, possibly at or near the upper opening 5, above the fuel grate 8; a hemispherical cover 12 which is removably positionable on the open top 5 of the lower housing 4 for closing the grill 2; one or more adjustable air intake openings 14 positioned in the bottom of the bowl-shaped lower housing 4 of the grill 2; and a plurality of adjustable air exhaust openings 15 positioned in the top of the hemispherical cover 12.

The prior art grill 2 is operated by first placing a bed of charcoal on the fuel grate 8 and then igniting the charcoal in some manner and allowing the charcoal to burn until the charcoal is converted into a bed of glowing red coals. Next, the food is placed on the cooking grate 10 and can be cooked either with the cover 12 in place over the top 5 of the bowl-shaped lower housing 4 or with the top 5 of the lower housing 4 open.

Unfortunately, the prior art kettle grill 2 has various significant shortcomings and disadvantages. When exposed to winds of as much as 5 miles per hour, or sometimes less, the flow of the wind across the bottom of the lower housing 4 and across the top of the cover 12 creates negative pressure conditions outside of both the bottom air intake openings 14 and the top air exhaust openings 15. The creation of a negative pressure condition outside of the bottom air intake openings 14 at least reduces the amount of air flowing into the air intake openings 14 and, in some cases, can create a reverse flow situation wherein air from inside the grill 2 flows out of the bottom air intake openings 14.

As a result, the desired upward flow of air through the charcoal bed of the prior art grill 2 is reduced or eliminated, thus slowing or retarding the combustion of the charcoal fuel. Therefore, either the cooking process in the prior art kettle grill 2 is significantly delayed, or the user will attempt to counteract the increased cooking time and reduced cooking temperature caused by the wind by using a significantly greater amount of charcoal. But in either case, the lack of a consistent, positive air flow through the charcoal bed diminishes the ability of the prior art grill 2 to cook by infrared radiation or convection.

Another problem with the prior art kettle grill 2 is that, even under zero wind conditions, air preferentially flows upwardly from the bottom air intake openings 14 through the center of the charcoal bed. This results in uneven or incomplete burning of the bed and causes the center of the bed to be significantly hotter than the remainder thereof. Consequently, the cooking temperatures produced across the surface of the cooking grate 10 are also very uneven and the time required to adequately combust the entire charcoal bed prior to cooking is increased significantly.

In addition, because the airflow to a large portion of the charcoal bed is inadequate, the cooking temperatures achieved across at least most of the cooking grate 10 typically are not hot enough to produce attractive sear marks on the food. Moreover, as a further result of the various operational and performance deficiencies listed above, a standard size load of charcoal used in the prior art grill 2 is often effective for cooking only one batch of hamburger patties.

Figure 3:
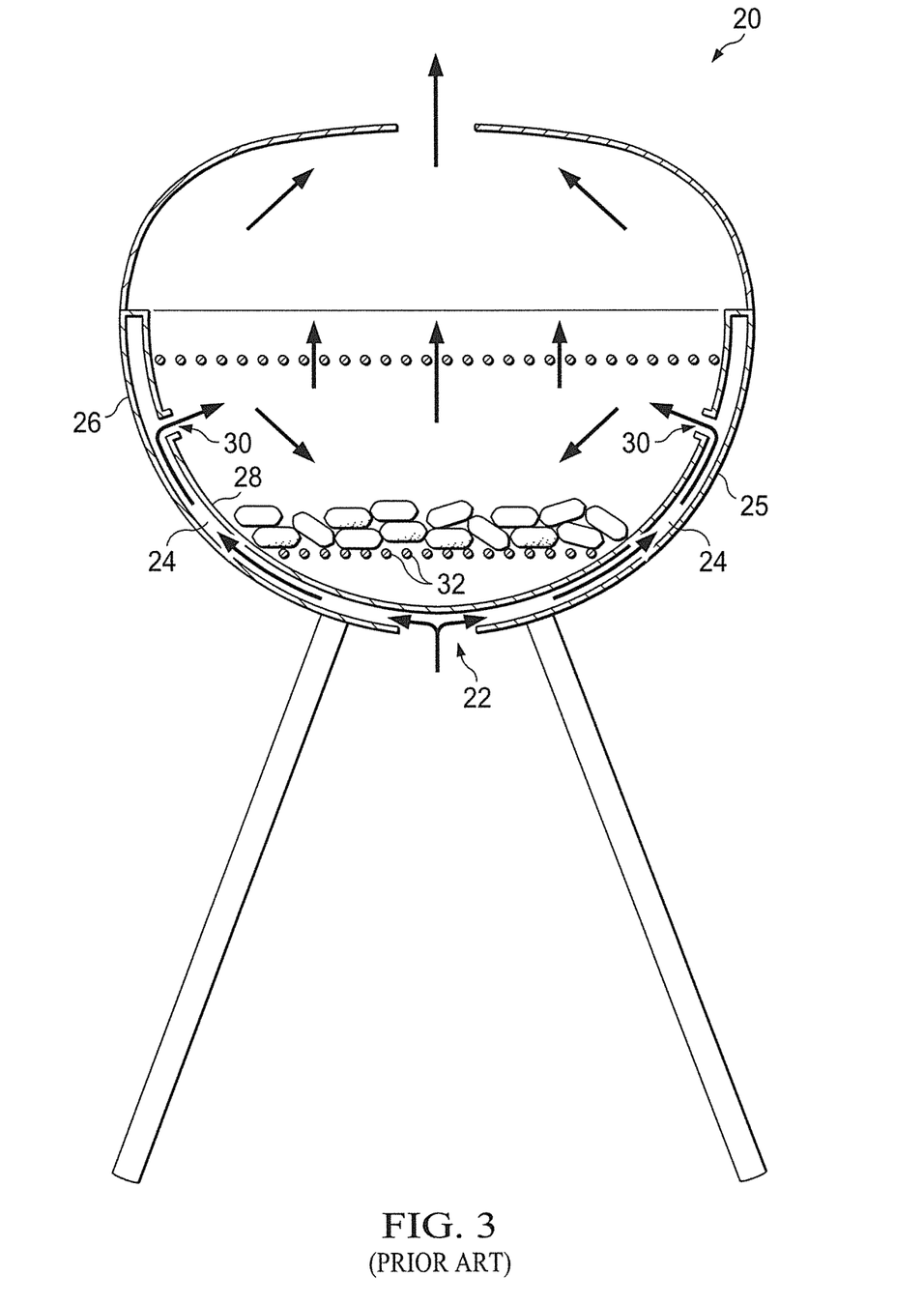
FIG. 3 is a cutaway elevational view of a kettle-type lower housing 26 of a prior art kettle grill 20.

Another prior art kettle grill 20 described in Danish Patent PA 200101276 is illustrated in FIG. 3. The prior art kettle grill 20 illustrated in FIG. 3 is substantially identical to the prior grill 2 illustrated in FIGS. 1 and 2 except that air received through the bottom opening(s) 22 of the grill 20 does not flow directly upward through the center of the charcoal bed. Rather, the air received through the bottom openings 22 of the grill 20 is routed through a gap 24 formed between the outer wall 25 of the hemispherical lower housing 26 of the grill 20 and a correspondingly shaped inner liner 28 positioned within the housing 26. The air flowing through the gap 24 is delivered to a series of ports 30 provided through the inner liner 28 which encircle the outer periphery of the fuel grate 32.

The delivery of the combustion air through the surrounding side ports 30, along with a corresponding circulation of air which is also produced within the center housing 26, cause the charcoal bed on the fuel grate 32 to burn more evenly as described above with respect to prior art kettle grill 2 of FIGS. 1 and 2. In addition the combustion air is preheated as it is delivered through the gap 24 between the outer wall 25 and the inner liner 28 of the bowl-shaped housing 26. This increases the amount of convective heating occurring thus increases the efficiency of the grill. In this case, the delivery of the combustion air through the gap 24 also operates to cool the inner liner. Consequently, although the amount of convective heating that occurs in the grill 20 is increased, this increase in convective heating is produced at the expense of radiant heating from the inner liner 28. Since convective heating is in some respects less desirable than infrared heating at these cooking temperatures, the replacement of infrared heating within the prior art kettle grill 20 with convective heating may be detrimental to the overall performance of the unit.

However, because the air intake openings 22 of the prior art grill 20 are located on the bottom of the cooking bowl 26, the prior art grill 20 is still highly susceptible to the conditions described above.

Thus, for the reasons explained above, a need exists for an improved kettle-type grill wherein: (a) the performance of the grill will not be significantly effected even when the grill is operated in winds of up to 5 mph or greater; (b) the charcoal bed within the kettle-type lower housing will burn more evenly; (c) more even temperature and cooking profiles will be achieved at the cooking grate; (d) the temperature at the cooking grate will be increased so that the grill will cook more effectively and will produce attractive sear marks; (e) the charcoal burning time required before cooking will be significantly reduced; (f) the grill will be more efficient and will use less charcoal; and (g) a single load of charcoal will be able to cook from two to three or more times more food than can be cooked by the same load of charcoal in the prior art kettle grills.

The problems above, and related problems, are addressed by the devices and methods of the present disclosure.

SUMMARY OF THE INVENTION

The invention of the present disclosure, in one aspect thereof, comprises a grill having a lower housing and a fuel grate situated at a predetermined level within the lower housing for supporting a fuel source. The lower housing has a first wall defining a plurality of air intake openings proximate the level of the fuel grate. In some embodiments, a cooking grate is situated above the fuel grate. An upper cover may be positionable on the lower housing to cover the cooking grate and may provide an exhaust opening. A baffle ring may reside in the lower housing, proximate the plurality of air intakes In some embodiments, the lower housing has a double walled construction with a second, inner wall providing a plurality of air intake openings. The openings of the inner wall may be vertically proximate the openings of the first wall or may be substantially vertically offset from the openings of the first wall. At least the plurality of openings of the inner wall may be below the fuel grate or the plurality of openings of the first wall and the plurality of openings of the second wall may both be below the fuel grate.

In other embodiments, the grill further comprises a second wall, interior to the first wall, having at least one opening below the fuel grate and defining a first air passageway between the first and second wall, and a third wall, interior to the second wall, having a termination proximate the fuel grate, and defining a second air passageway between the second and third wall. Air communicates between the first and second air passageways via the at least one opening of the second wall. Air is communicated to the fuel grate at the termination of the third wall.

The invention of the present disclosure, in another aspect thereof, comprises a grill with a lower kettle housing having a cooking grate supported above a fuel grate in an interior of the housing, and a cover at least partially covering the cooking grate and defining an exhaust opening. The lower housing provides a plurality of air intake openings proximate a level of the fuel grate. In some embodiments, a baffle ring is proximate the plurality of air intake openings and circumscribing at least part of the fuel grate.

In some embodiments, the housing has a double walled construction comprising an inner wall with a plurality of openings proximate the fuel grate and an outer wall with a plurality of openings proximate those openings of the inner wall. The plurality of openings of the inner wall may be below the fuel grate as may the openings of the outer wall.

In other embodiments, the grill housing has a double walled construction comprising an outer wall with a plurality of openings proximate a vertical level of the fuel grate and an outer wall with a plurality of openings substantially offset from those openings of the inner wall. In further embodiments, the housing has a triple walled construction with air passing from openings on an outer wall that are proximate a vertical level of the fuel grate to an opening on a middle wall that is below the fuel grate, and air passing thence to a termination of an interior wall proximate the vertical level of the fuel grate.

The invention of the present disclosure, in another aspect thereof, comprises a method including forming a housing and a cover with an exhaust opening, providing a fuel grate in the housing, providing a cooking grate above the fuel grate, and creating a plurality of openings in the housing proximate a vertical level of the cooking grate.

The method may further comprise providing a baffle ring within the housing proximate the plurality of openings. Forming a housing may further comprise forming a double walled housing, and creating a plurality of openings in the housing may further comprise forming a plurality of openings in an outer wall proximate a vertical level of the cooking grate. Forming a housing may further comprise forming a triple walled housing, and creating a plurality of openings in the housing further comprises forming a plurality of openings in an outer wall proximate a vertical level of the cooking grate.

DETAILED DESCRIPTION OF THE PREFERRED EMBODIMENTS

The grills of the present disclosure satisfy the needs and alleviate the problems discussed above, and others. Various embodiments of the present disclosure provide kettle-type cooking grill comprising: (a) a kettle-type lower housing which has a heating chamber therein and an open upper end; (b) a fuel support grate positionable within the heating chamber; (c) a food support grate positionable above the fuel grate; (d) a top cover which is removably positionable over the upper opening of the lower housing; and (e) one or more air exhaust openings provided in the top of the cover. One improvement to the cooking grill comprises a plurality of air intake openings which are formed through and substantially around an upwardly extending portion of an outer wall of the kettle-type lower housing such that the air intake openings substantially surround the heating chamber.

The air intake openings are preferably located substantially in a horizontal plane which extends traversely through the lower housing at a similar level as the food support grate and above the bottom of the heating chamber. The air intake openings are more preferably located substantially in a horizontal plane which is not more than 3 inches below the fuel grate and not more than 3 inches above the fuel grate.

Further aspects, features, and advantages of the present invention will be apparent to those of ordinary skill in the art upon examining the accompanying drawings and upon reading the following detailed description of the preferred embodiments.

Figure 4:
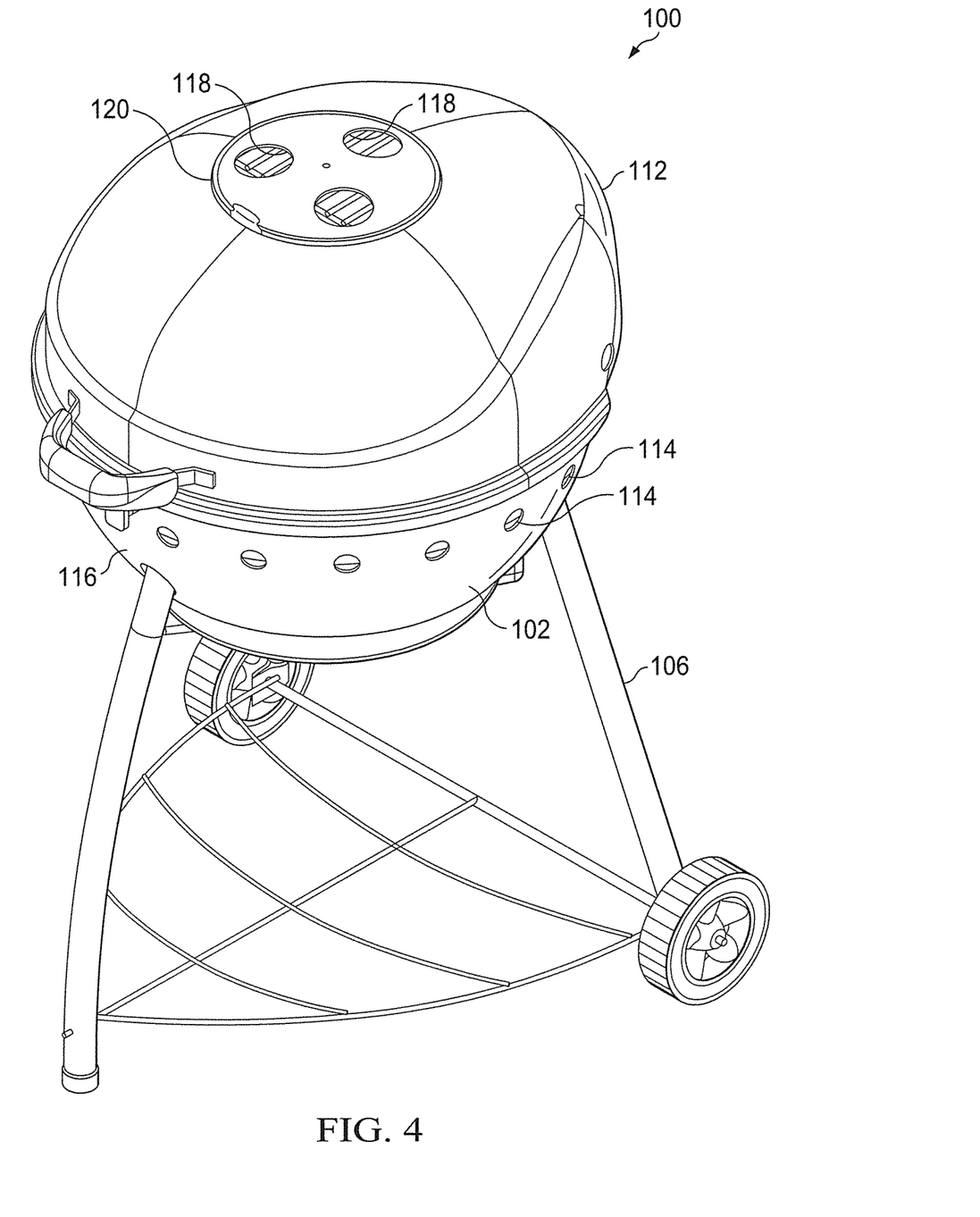
FIG. 4 is a perspective view of an embodiment of grill 100 according to the present disclosure.
Figure 5A:
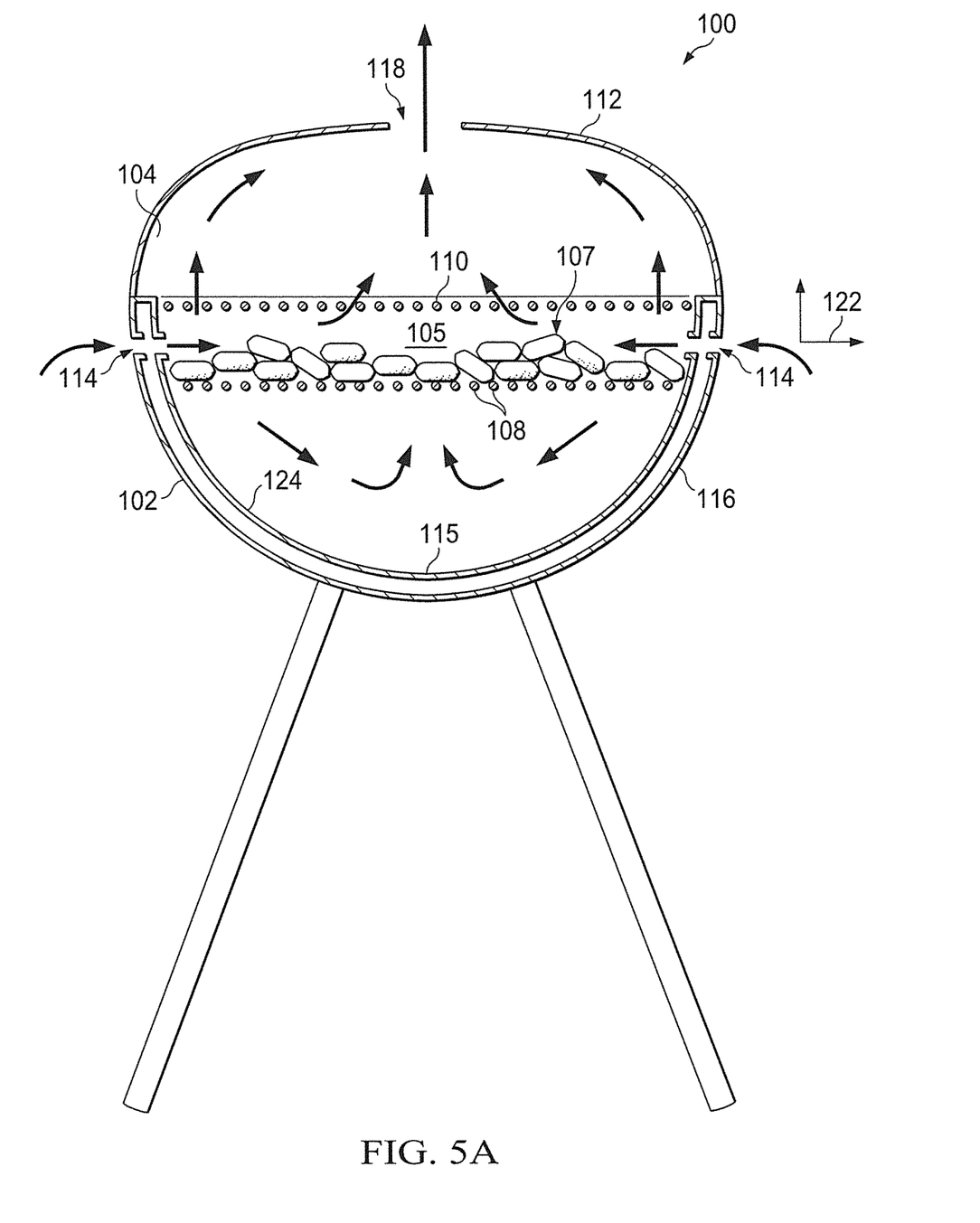
FIG. 5A is a cutaway elevational view of the grill 100.
Figure 5B:
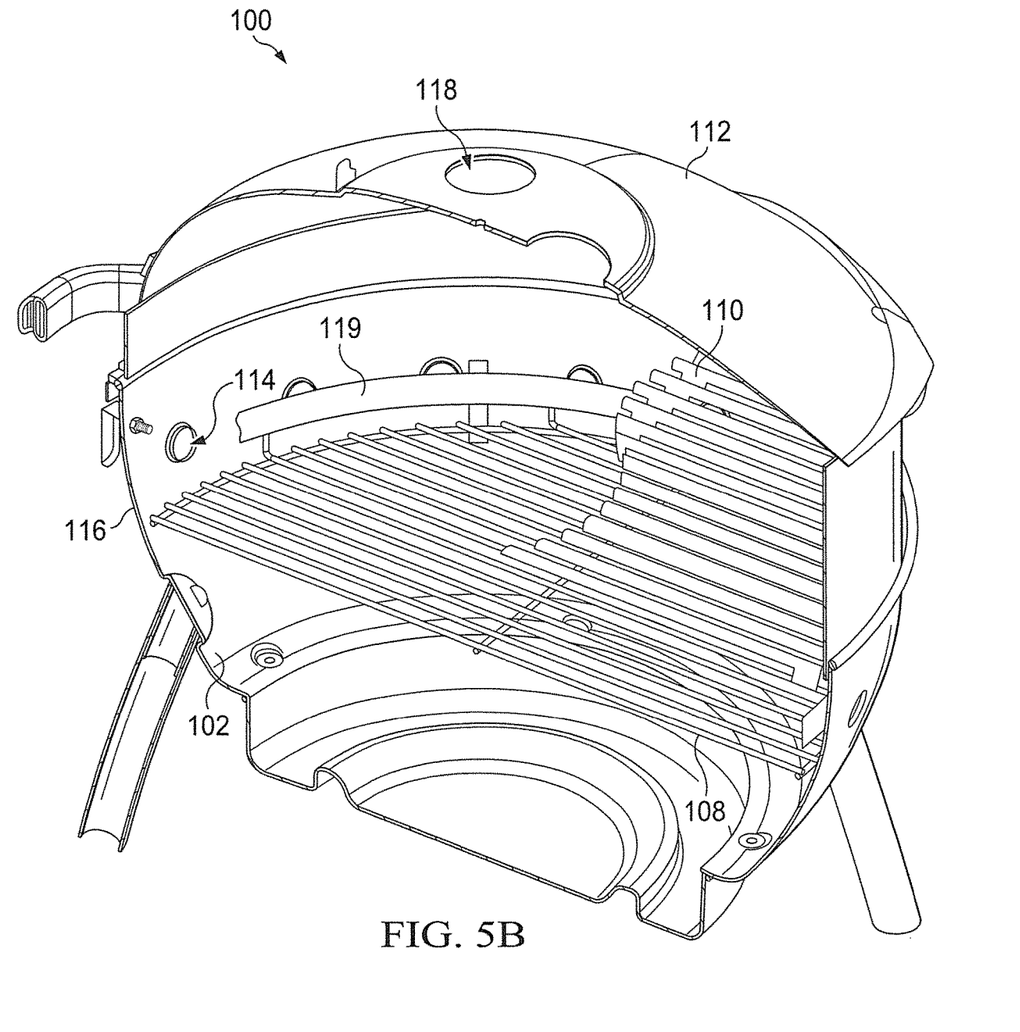
FIG. 5B is an cutaway elevational view of the grill 100.

An exemplary preferred embodiment of a grill 100 is illustrated in FIGS. 4, 5A and 5B. The grill 100 comprises: a generally hemispherical kettle-type lower housing 102 having an open top 104; a heating chamber 105 defined within the lower housing 102; a plurality of legs 106 or other support structure which supports the lower housing 102 above the ground; a fuel grate 108 which is removably positioned in the heating chamber 105 for supporting a bed of charcoal or other solid fuel 107; a cooking grate 110 which is removably positionable above the fuel grate 108 at a location within the heating chamber 105 possibly at or near the open top 104 of the lower housing 102; a cover 112 which is removably positionable on the lower housing 102 over the open top 104 thereof; a series of perforations or air intake openings 114 which are formed laterally around and through an upwardly extending portion of outer wall 116 of the lower housing 102 such that the openings 114 preferably encircle or otherwise traversely surround the heating chamber 105 within the lower housing 102; one or more (preferably a plurality of) air exhaust openings 118 formed through the top of the cover 112; and one or more (preferably a plurality of) dampers or shutter plates 120 movably attached to the top of the cover 112 for selectively opening, closing, or partially closing the air exhaust openings 118 to any degree desired.

As used herein, and in the claims, the term "kettle-type lower housing" refers to a grill bottom structure which contains and defines the heating chamber wherein charcoal or other solid fuel is placed and burned and which is shaped such that, along at least 90% of the vertical height of the lower housing structure, the horizontal cross-sectional shape of the lower housing structure is generally circular. More preferably, the horizontal cross-sectional shape of the lower housing structure along substantially the entire vertical height thereof will be circular or substantially circular. Consequently, by way of example, but not by way of limitation, a "kettle-type lower housing" could have: (a) hemispherical or generally hemispherical shape, (b) a paraboloid shape, (c) a frustoconical or generally frustoconical shape, (d) a cylindrical or generally cylindrical shape, or (e) a combination thereof. Despite the foregoing, it is understood that in some embodiments, the lower housing 102 may be of a shape that departs from what might be considered a kettle type lower housing and relies instead upon various shapes and geometries as are known to those of skill in the art.

The air intake openings 114 of the grill 100 are preferably positioned in substantially a horizontal plane 122, which extends transversely through the kettle-type lower housing 102. The horizontal plane 122 is preferably located at a similar level to the cooking grate 110 and above the bottom 115 of the heating chamber 105. The horizontal plane 122 is more preferably located at an elevation of anywhere from about 2 inches below to about 2 inches above the fuel grate 108 and is most preferably located at an elevation in the range of from about 1 inch below to about 1 inch above the fuel grate 108.

In the grill 100, as illustrated in FIGS. 4 and 5, the air intake openings 114 are positioned elevationally above the fuel grate 108 and encircle the heating chamber 105. The air intake openings 114 place the heating chamber 105 in direct fluid communication with the air outside of the upwardly extending outer wall 116 of the lower housing 102 such that the outside air is allowed to flow horizontally directly through the air intake openings 114 into the interior heating chamber 105.

The lower housing 102 can be of a single wall, double wall, partial double wall, or even a triple wall construction. A double wall or partial double wall construction will help to (a) prevent heat loss, (b) increase the radiating temperature of the inner wall of the lower housing, and (c) shield the outer wall of the lower housing 102 from direct exposure to the heating chamber 105 to thereby reduce the temperature of the outer wall.

As illustrated in FIG. 5A, the lower housing 102 of the grill 100 includes an inner lining wall 124 which can be a permanent liner or can operate as a removable ash pan which only covers a lower portion of the interior of the lower housing 102 below the air intake openings 114. If the inner lining wall 124 is a removable ash pan, it will also be understood that the grill 100 can be operated either with or without the ash pan in place. Alternatively, the inner liner could be a removable or permanent liner which covers substantially the entire interior of the lower housing 102 such that the air intake openings 114 would extend directly through both the outer wall and the inner liner of the lower housing 102 into the heating chamber 105.

If desired, in order to adjust the amount of air flowing into the heating chamber through the air intake openings 114, a thin, sliding, sheet metal shutter (or other selective opening) can be provided for opening, closing, or partially restricting the air intake openings 114.

Although the air intake openings 114 of the grill 100 are circular in shape, it will be understood that the openings can be in the form of squares, rectangles, slits or other shapes and can be of any desired size, number, and spacing suitable for providing sufficient outside air to the heating chamber 105 for combustion of the charcoal or other solid fuel 107.

In windy conditions, in the present embodiment, the positioning of the air intake openings 114 through an upwardly extending portion of the outer wall 116 of the lower housing 102 allows the direct horizontal flow of outside air into the heating chamber 105 through the particular openings 114 which are directly facing the wind (i.e., for reference purposes, are facing into the wind at a downward angle of 0° and a sideways angle of 0°) or are at least facing the wind at a downward angle of preferably not more than 75° and/or a right or left sideways angle of preferably not more than 75°. To summarize, various embodiments of grills of the present disclosure produce a positive flow of air into the heating chamber below the cooking grate even in the presence of wind. Moreover, regardless of whether the grill is operated under windy conditions or with no wind, the incoming flow through the openings 114, along with the circulation of the air in the center of the heating chamber 105 which this flow also produces, provides a more uniform flow of air to the entire fuel grate 108 than is provided in the prior art kettle grills.

The more uniform distribution of air across the entire fuel grate 108, and the more uniform combustion which it produces, also operate to provide more uniform temperatures and cooking conditions at the cooking grate 110 and to significantly increase the temperature at the cooking grate 110, even under any wind conditions. Consequently, with or without wind, the food will cook more rapidly at a higher temperature in the grill 100 so that the cooking performance is significantly enhanced and attractive searing marks can be produced.

The grill 100 is also much more stable under windy conditions and is much less susceptible diminution in cooking efficacy or other problems due to wind. Because the air intake openings 114 of the grill 100 are located near to and around the fuel grate 108, a positive pressure is created at the air intake openings 114 which face or partially face the wind. Thus, not only will the flow of air through these openings 114 and across the fuel grate 108 continue even under sustained winds of 5 mph, 10 mph or more, but the amount of air flowing through the windward openings will increase and will compensate for the reduction of flow which may occur through the remaining air intake openings which are located on the opposite side of the grill or which face in a direction which is substantially perpendicular to the direction of the wind. Consequently, not only does the grill 100 substantially ensure against charcoal blowout, but a high level of combustion resulting in a high level of infrared heat transfer to the food is maintained.

The cooking grate 110 used in the grill 100 can be (a) a wire mesh or other type of open convective food support grate or (b) an infrared re-emitting food support grate of any desired single or multiple piece construction. The cooking grate 110 will preferably be an infrared food support grate which is placed close to (i.e., within about 3 inches of) the fuel grate 108. Placing the cooking grate 110 in close proximity to the fuel bed 107 significantly increases the thermal efficiency of the grill 100.

The fuel grate 108 can be any type of perforated pan, perforated tray, wire grate, or other structure which is used in cooking grills for supporting a bed of charcoal or other solid fuel. The fuel grate 108 will preferably be a porcelain-coated or stainless steel wire grate having gaps between the support wires in range of from about 0.25 to about 0.5 inch.

Also shown in FIG. 5A is the baffle ring 119, which extends around the inside of the heating chamber, generally on a plane common to the combustion air intake openings 114. The ring may circumscribe all of a portion of the fuel grate 102. This ring can be incorporated in some embodiments to prevent ash and sparks from flowing out through downstream air inlet holes in windy conditions but will not necessarily need to be used in all embodiments. The dimensions, spacing, and construction of this ring for may be varied according to normal engineering practice so long as the result of arresting at least some sparks, embers, and/or ash from flowing out of the housing 102 is achieved.

Figure 6:
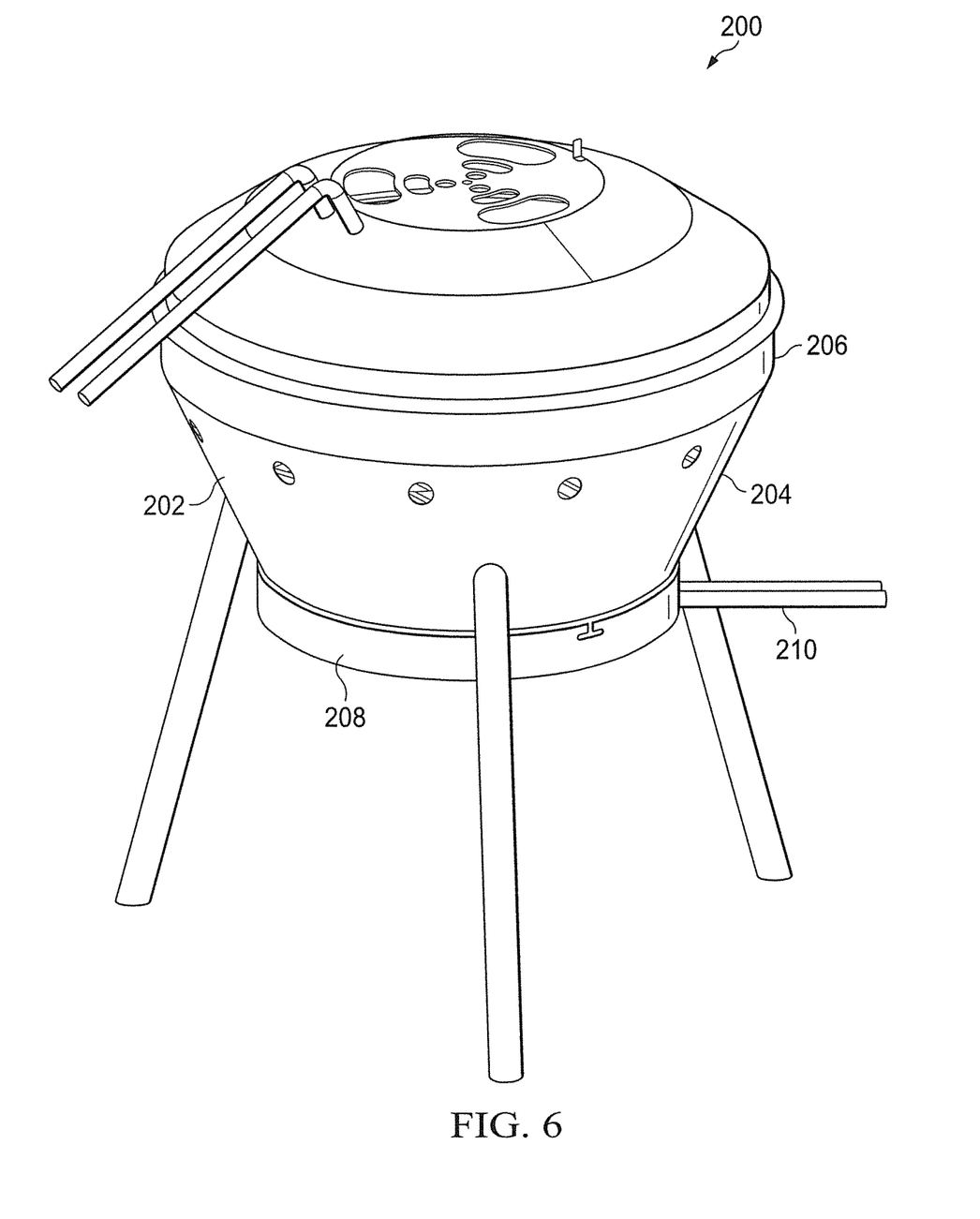
FIG. 6 is a perspective view of another embodiment a grill 200 according to the present disclosure.

Another embodiment 200 of a grill according to the present disclosure is illustrated in FIG. 6. The grill 200 is substantially identical to the grill 100 except that the kettle-type lower housing 202 of the grill 200 does not have a hemispherical shape but instead comprises a lower frusto-conical portion 204 and an upper cylindrical portion 206. In addition, the bottom 208 of the kettle 202 of the grill 200 is a removable ash pan which has a handle 210 extending therefrom which the user can grasp for rotating the ash pan 208 to a locked position on the bottom of the kettle 202. After use, the ash pan 208 can be rotated to an unlocked position in order to remove the ash and food debris which have collected on the pan 208.

Figure 7:
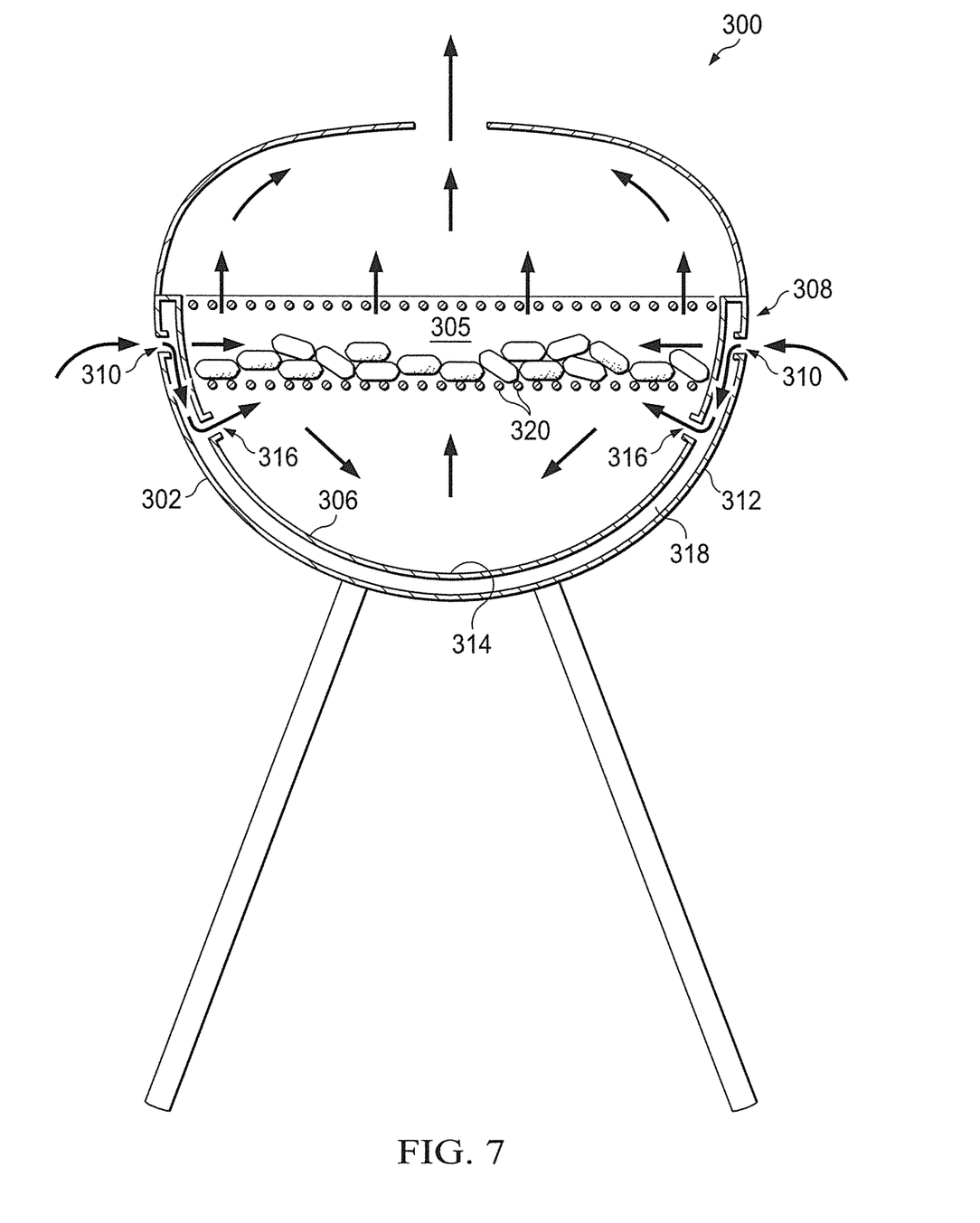
FIG. 7 is a cutaway elevational view of another embodiment of a grill 300 according to the present disclosure.

Another alternative embodiment 300 of the grill is illustrated in FIG. 7. The kettle-type lower housing 302 of the grill 300 differs from that of the grill 100 in that the interior of the lower housing 302 is entirely covered by a lining structure 306 comprising: an upper portion 308 which receives air from the air intake openings 310 provided through the outer wall 312; a lower portion 314 which is preferably removably positioned within the lower portion of the lower housing 302 to operate as a removable ash pan; and an air flow gap or a plurality of interior air flow openings 316 formed between the upper portion 308 of the liner and the ash pan 302.

The interior air openings 316 of the inner lining structure 306 are positioned elevationally below the air intake openings 310 provided in the outer wall 312 so that the combustion air flowing into the intake openings 310 flows downwardly through a gap 318 formed between the upper portion 308 of the inner liner and outer wall and is discharged by the interior openings 316 into the heating chamber 305 at a location below the fuel grate 320. It will be appreciated that, in this embodiment, a baffle ring 119 may not be needed.

Figure 8:
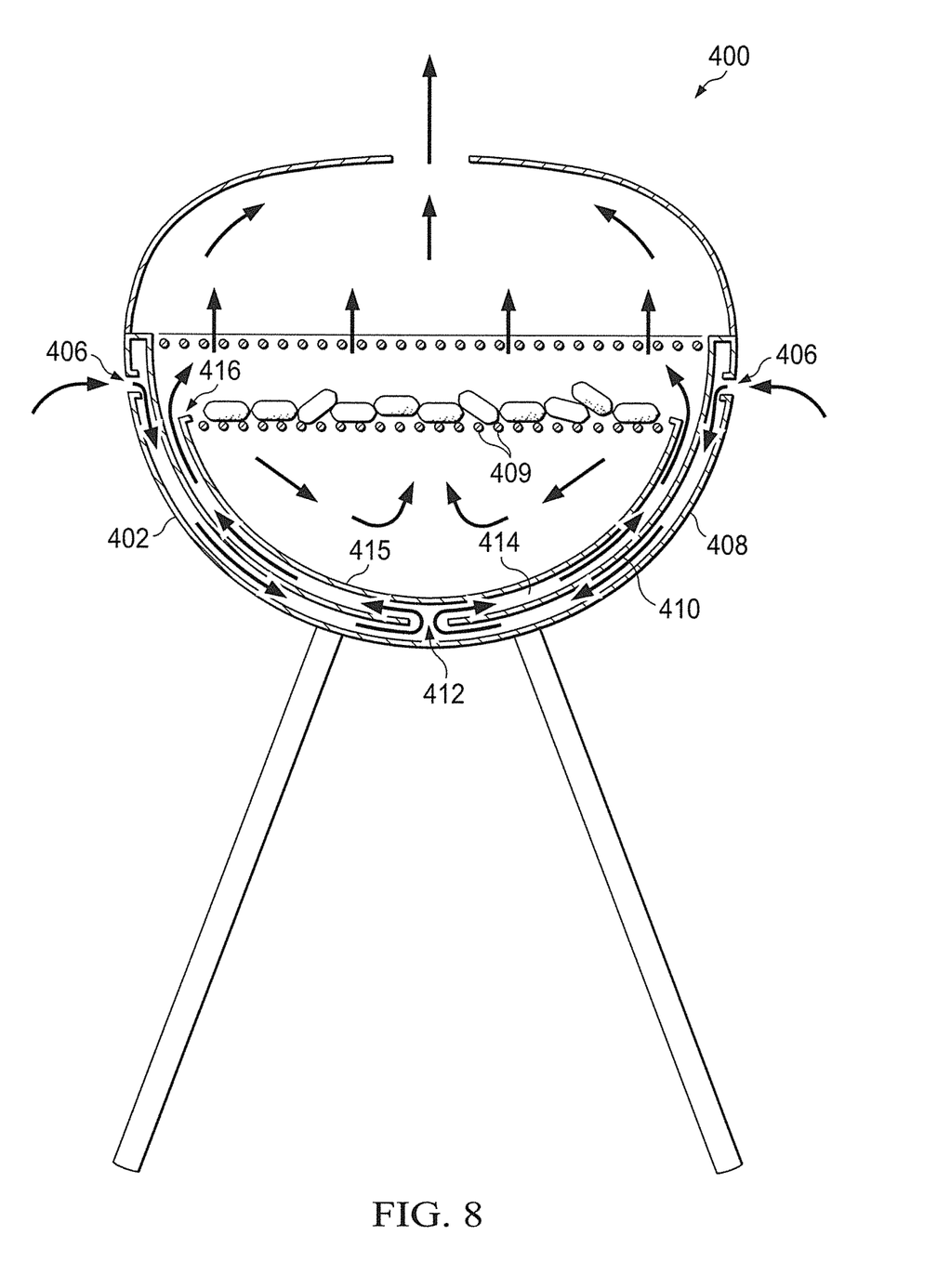
FIG. 8 is a cutaway elevational view of another embodiment of a grill 400 according to the present disclosure.

Another alternative embodiment 400 of the grill is illustrated in FIG. 8. The grill 400 differs from the grill 100 in that the kettle-type lower housing 402 of the grill 400 is of a triple-walled construction wherein air is received through air intake openings 406 formed through the outer wall 408 at a location at or above the fuel grate 409 and flows downwardly behind a first inner wall 410 to an opening 412 provided in the bottom of the kettle. The air then flows upwardly through a gap 414 formed between the first inner wall 410 and a second inner wall 415 and is released from the circular upper end 416 of the gap 414 around the outer periphery of the fuel grate 409. Thus the innermost wall 415 may be said to terminate proximate the fuel grate 409.

Figure 9:
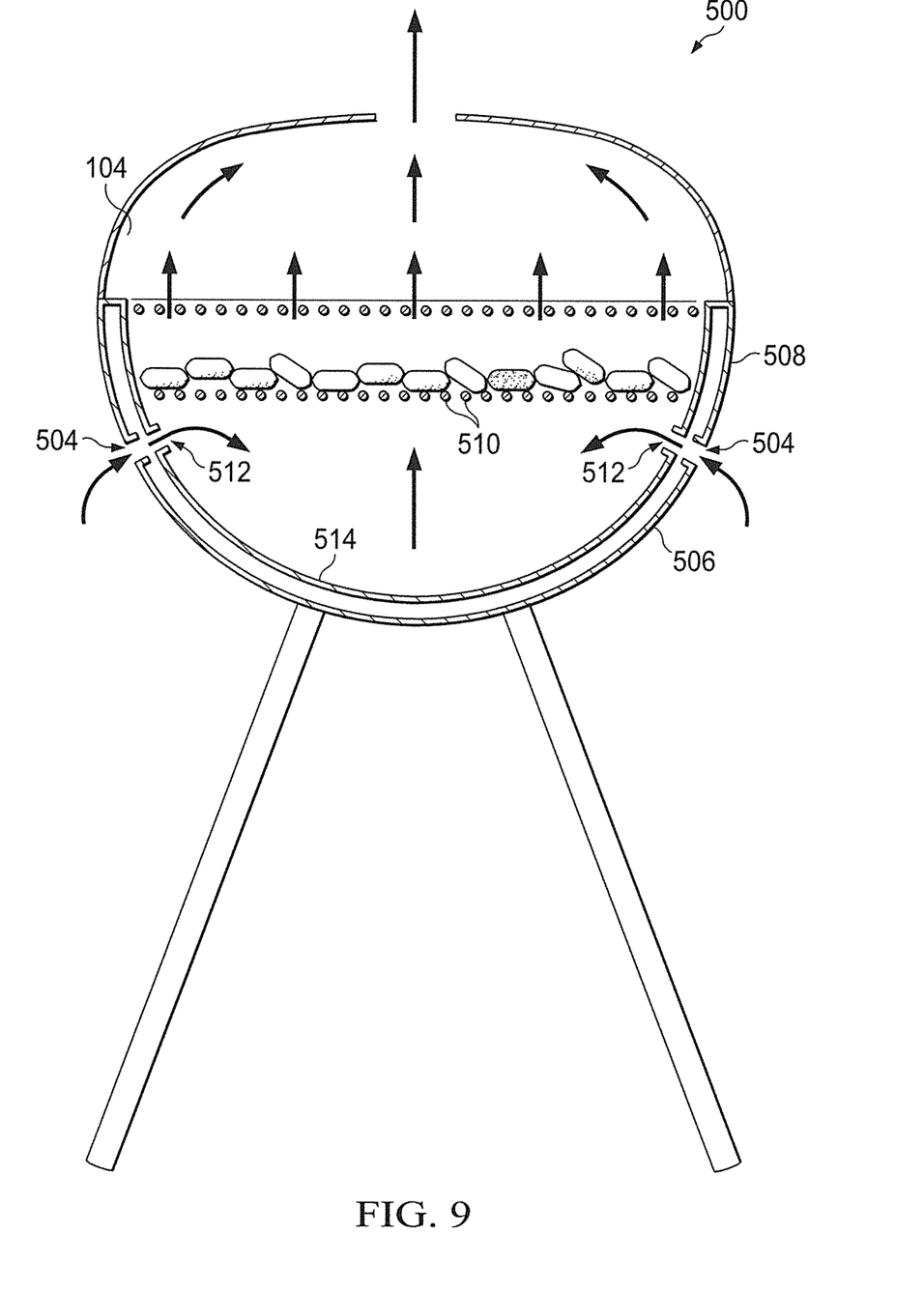
FIG. 9 is a cutaway elevational view of another embodiment of a grill 500 according to the present disclosure.

Another alternative embodiment 500 of the grill is illustrated in FIG. 9. The grill 500 differs from the grill 100 in that air is received through intake openings 504 located in the outer wall 506 of the kettle-type lower housing 508 at a location below the fuel grate 510 and flows directly through corresponding interior openings 512 formed in an inner liner 514 which are also located below the fuel grate 510.

It will be seen that the variations 300 and 500 shown in FIGS. 7 and 9 illustrate that in the context of a double walled construction the air openings (310, 504) in the outer wall (312, 506) can be offset from the air openings (316, 512) in the inner wall (306, 514), or aligned with the openings in the inner wall. In some cases they may be substantially vertically offset (for purposes of this disclosure, this means that air passing from outside to inside the housing (202, 302, 402, etc.) is required to take a tortured path as shown in FIGS. 7 and 8). The air openings in the outer wall can be above the level of the fuel grate or below the level of the fuel grate as previously disclosed and the air openings in the inner wall can be above or below the level of the fuel grate as similarly disclosed. Any combination of relative position of air openings that prevents wind from starving the fuel of oxygen will be effective and/or provides air supply to the fuel may be suitable.

Figure 10:
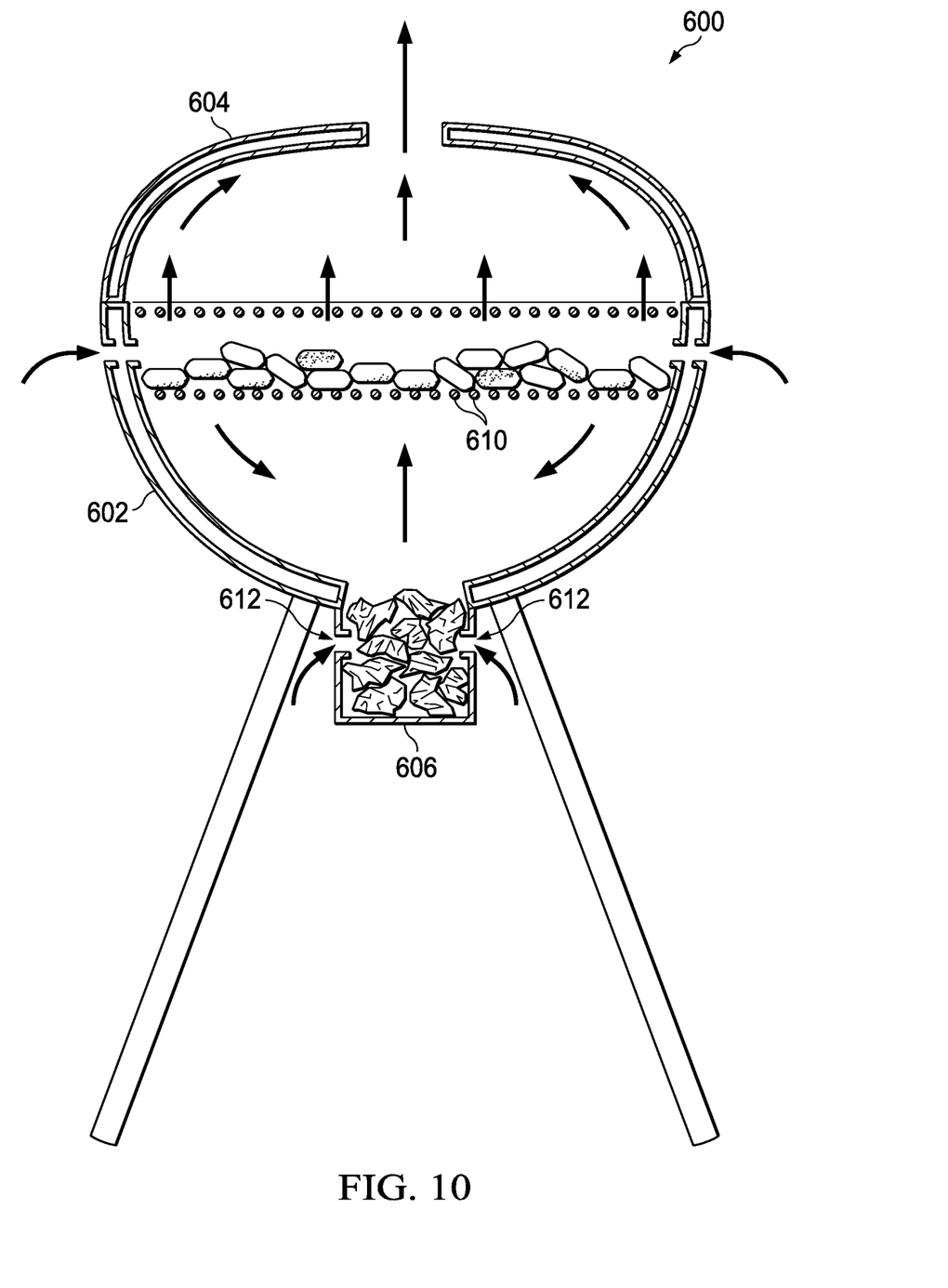
FIG. 10 is a cutaway elevational view of another embodiment of a grill 600 according to the present disclosure.

Another alternative embodiment 600 of the grill is illustrated in FIG. 10. The grill 600 differs from the grill 100 in that both the kettle-type lower housing 602 and the cover 604 of the grill 600 are of a double-walled construction. In addition, the grill 600 includes a charcoal lighter can 606 which is removably attachable to the bottom of the lower housing 602 for holding crumpled newspaper or other combustible material which can be burned in the can 606 for igniting the charcoal or other solid fuel placed on the fuel grate 610. The can 606 includes inlet air openings 612 having dampers or shutters thereon such that the openings 612 can be opened for burning the newspaper or other starter material and then closed during operation after the charcoal on the fuel grate 610 is ignited so that all combustion air for consumption of charcoal once lit is provided by the openings such as 114, shown in FIGS. 4 and 5, openings such as 318 and 316 found in FIG. 7, etc.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the invention as defined by the claims.

What is claimed is:

1. A grill comprising:
a lower housing defining a kettle-type heating chamber; and
a fuel grate situated at a predetermined level within the lower housing for supporting a fuel source;
wherein the lower housing has a first wall defining a first plurality of air intake openings proximate the level of the fuel grate;
wherein the lower housing has a double wall construction comprising a second, inner wall covering substantially an entire interior of the lower housing and provides a second plurality of air intake openings proximate the level of the first plurality of air intake openings and on a same horizontal plane therewith such that at least a portion of the first plurality of air intake openings and at least a portion of the second air intake openings are aligned on the same vertical level.

2. The grill of claim 1, further comprising:
a cooking grate situated above the fuel grate.

3. The grill of claim 2, further comprising:
an upper cover positionable on the lower housing to cover the cooking grate;
wherein the upper cover provides an exhaust opening.

4. The grill of claim 1, wherein at least the plurality of openings of the inner wall are below the fuel grate.

5. The grill of claim 1, wherein the plurality of openings of the first wall and the plurality of openings of the second wall are both below the fuel grate.

6. A grill comprising:
a lower kettle type grill housing having a first wall defining a plurality of air intake openings and having a circular horizontal cross section along at least 90% of the vertical height thereof;
a fuel grate situated at a predetermined level within the lower housing vertically proximate the plurality of air intake openings for supporting a fuel source;
a cooking grate situated above the fuel grate;
a second wall, interior to the first wall, having at least one opening below the fuel grate proximate a lower most point of the kettle grill housing and defining a first air passageway between the first and second wall; and
a third wall, interior to the second wall, having a termination proximate the fuel grate but below the cooking grate, and defining a second air passageway between the second and third wall;
wherein air communicates between the first and second air passageways via the at least one opening of the second wall;
wherein air is communicated to the fuel grate at the termination of the third wall; and
wherein the first, second, and third walls are generally hemispherical in shape comprising a triple wall construction, and the first, second, and third walls each extend below the fuel grate such that the first and second air passages are both defined, at least in part, below fuel grate and air entering the air intake openings of the first wall must traverse the first and second air passageways to reach the fuel grate.

* * * * *